(No Model.) 6 Sheets—Sheet 2.
H. E. FOWLER.
MACHINE FOR WELDING METALS.

No. 450,666. Patented Apr. 21, 1891.

Witnesses,
S. T. Mann,
Frederick C. Goodwin

Inventor
Herbert E. Fowler
By Offield & Towle
Atty's.

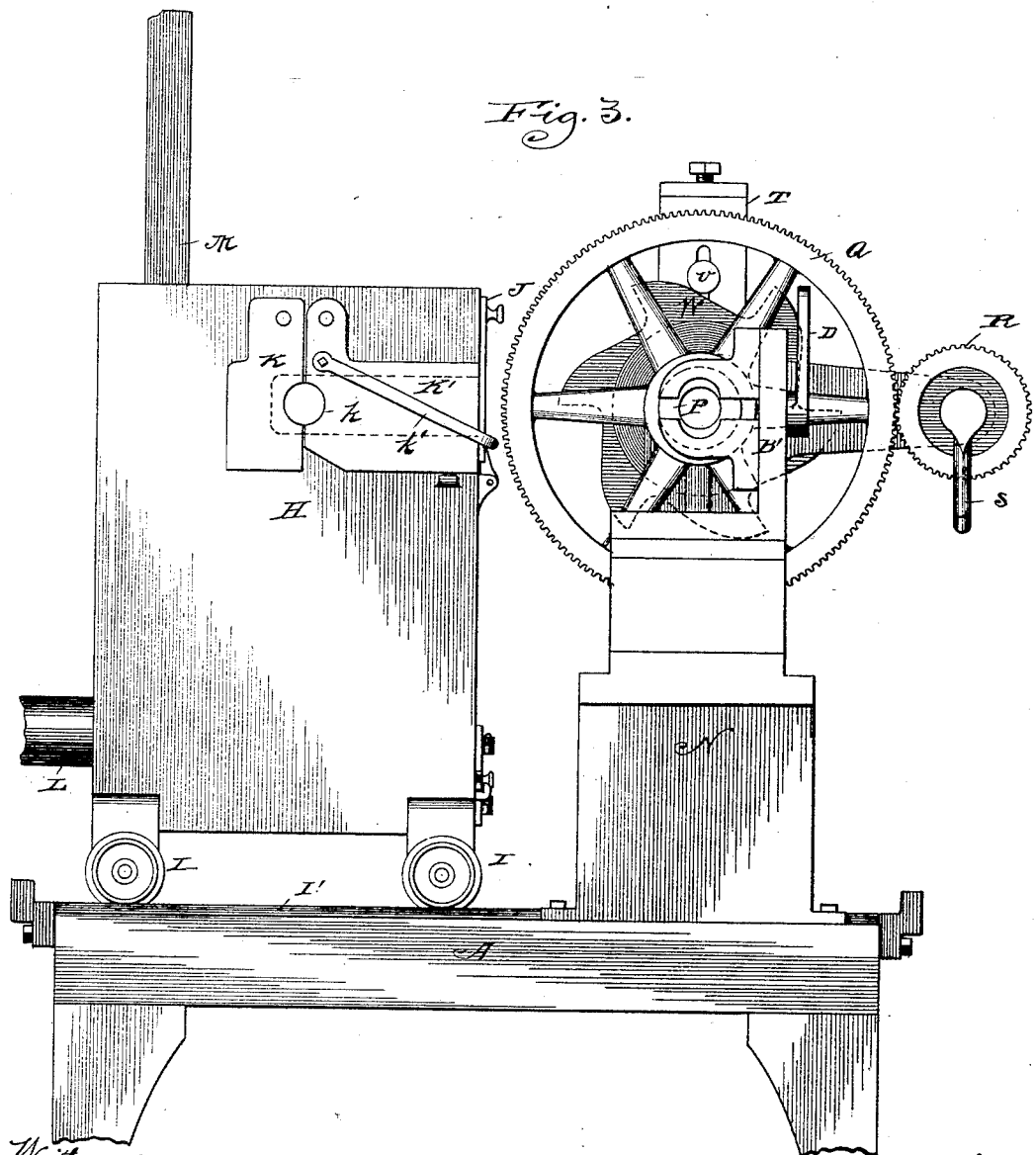

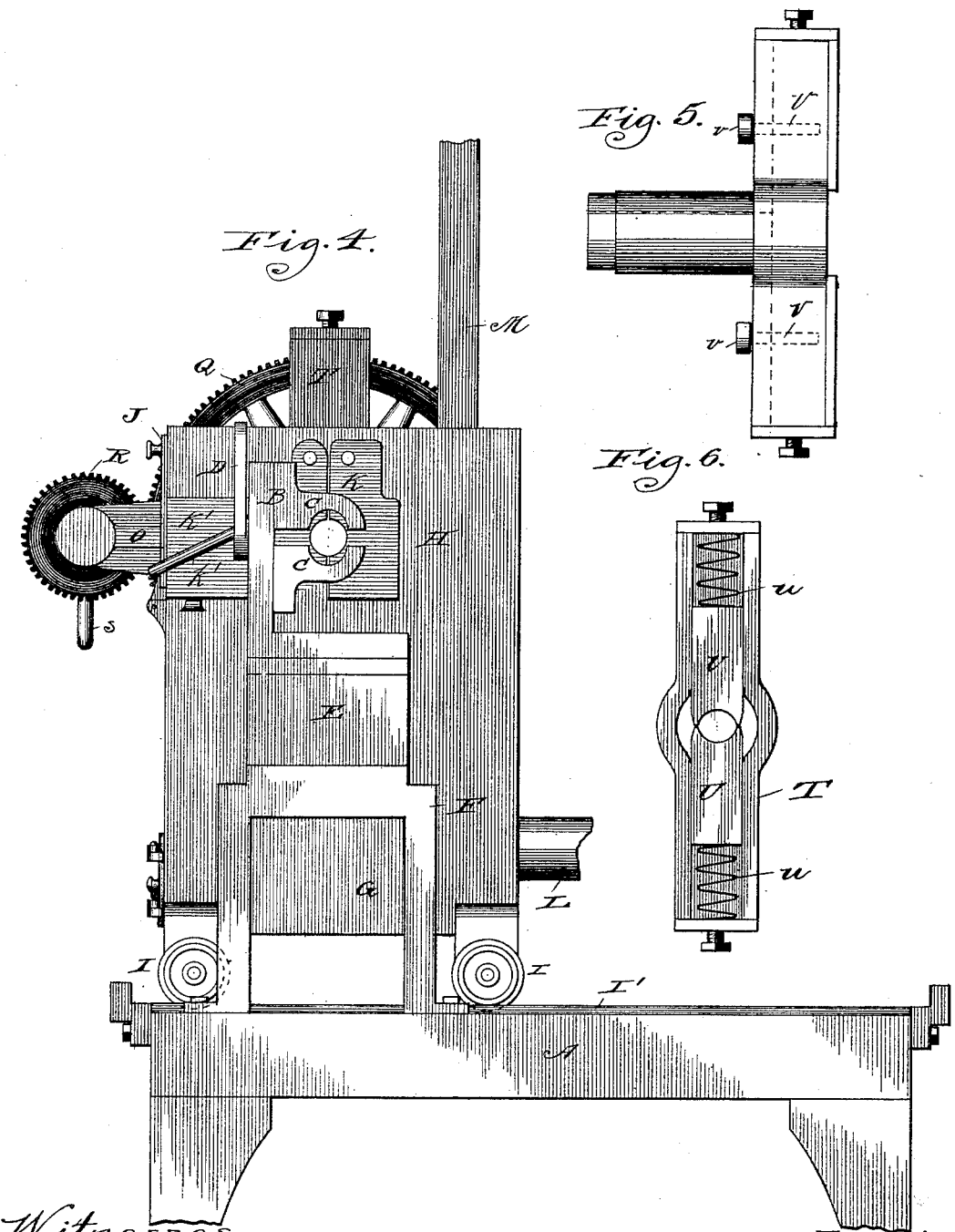

(No Model.) 6 Sheets—Sheet 5.
H. E. FOWLER.
MACHINE FOR WELDING METALS.
No. 450,666. Patented Apr. 21, 1891.
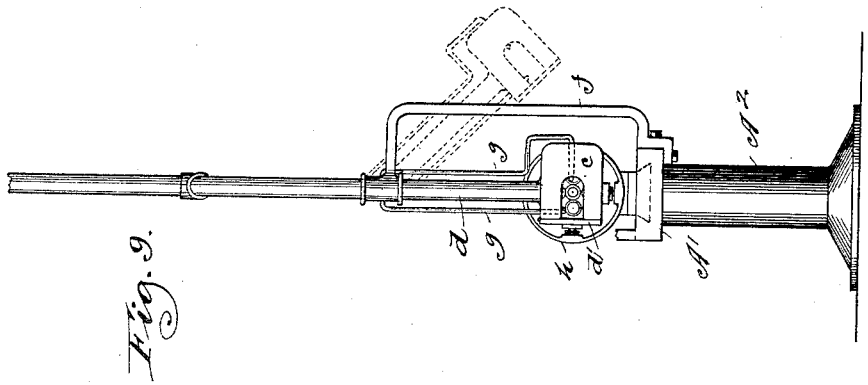
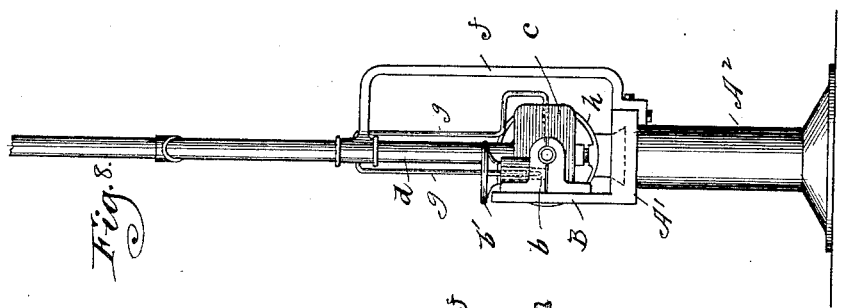
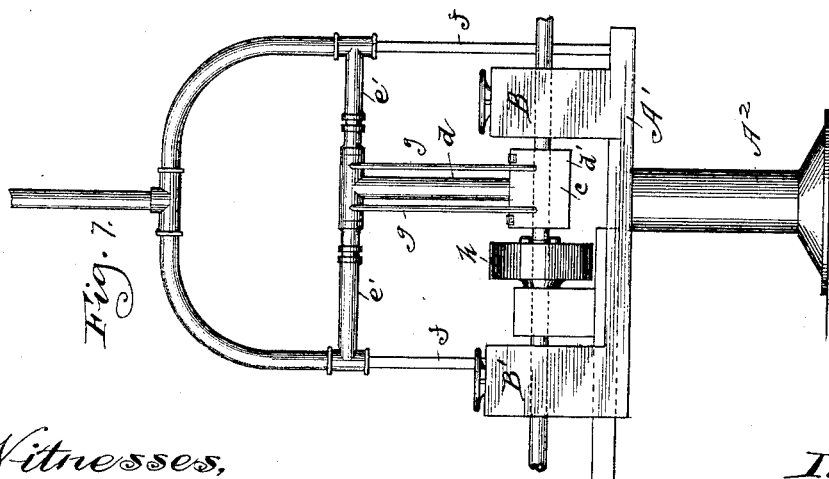
Witnesses,
D. F. Mann.
Frederick J. Goodwin.
Inventor,
Herbert E. Fowler
By Offield & Towle
Attys.

(No Model.)  6 Sheets—Sheet 6.

H. E. FOWLER.
MACHINE FOR WELDING METALS.

No. 450,666.  Patented Apr. 21, 1891.

Witnesses,
L. T. Mann
Frederick G. Goodwin

Inventor,
Herbert E. Fowler
By Offield & Towle
Attys.

UNITED STATES PATENT OFFICE.

HERBERT E. FOWLER, OF NEW HAVEN, CONNECTICUT.

MACHINE FOR WELDING METALS.

SPECIFICATION forming part of Letters Patent No. 450,666, dated April 21, 1891.

Application filed August 1, 1890. Serial No. 360,647. (No model.)

*To all whom it may concern:*

Be it known that I, HERBERT E. FOWLER, a citizen of the United States, residing at New Haven, in the county of New Haven and State of Connecticut, have invented certain new and useful Improvements in Welding Metal, of which the following is a specification.

My invention relates to an apparatus for welding or joining bars, rods, tubes, or plates of metal; and the objects of the invention are to provide means whereby the parts to be joined may be held in line while their adjoining ends are brought to a welding heat, said ends being previously lapped, telescoped, or in contact, or, if desired, the said ends may be separated during the heating and afterward forced into contact by the movement of one or both of the clamps, whereby to upset them; means for heating the metal, comprising a furnace or other heating appliance adapted to be brought into position to apply the heat and afterward moved out of the way, and welding appliances mounted in line with the parts to be welded intermediate the clamps and adjustable along that line to bring them in position to perform the weld. The welding appliances may be rotating hammers or rolls, between which the parts to be joined are projected, and when hammers are employed they are preferably mounted in a head which is rotated about the joint, and the hammers are reciprocated within the head to effect the weld. When rolls are employed, they may also be mounted in a head, and for welding rods or tubes they may be rotated about the joint, or when used to weld bars or plates the heads may be reciprocated lengthwise of the joint to cause the rolls to work the joint. This method of welding provides for holding the parts rigidly in contact during the working of the joint and overcomes the tendency to separation under the blows or pressure of the welding appliance. The adjustability of the heating apparatus permits the welding to be performed without moving the work, and the net results are saving of time and fuel and a strong weld.

Figure 1:
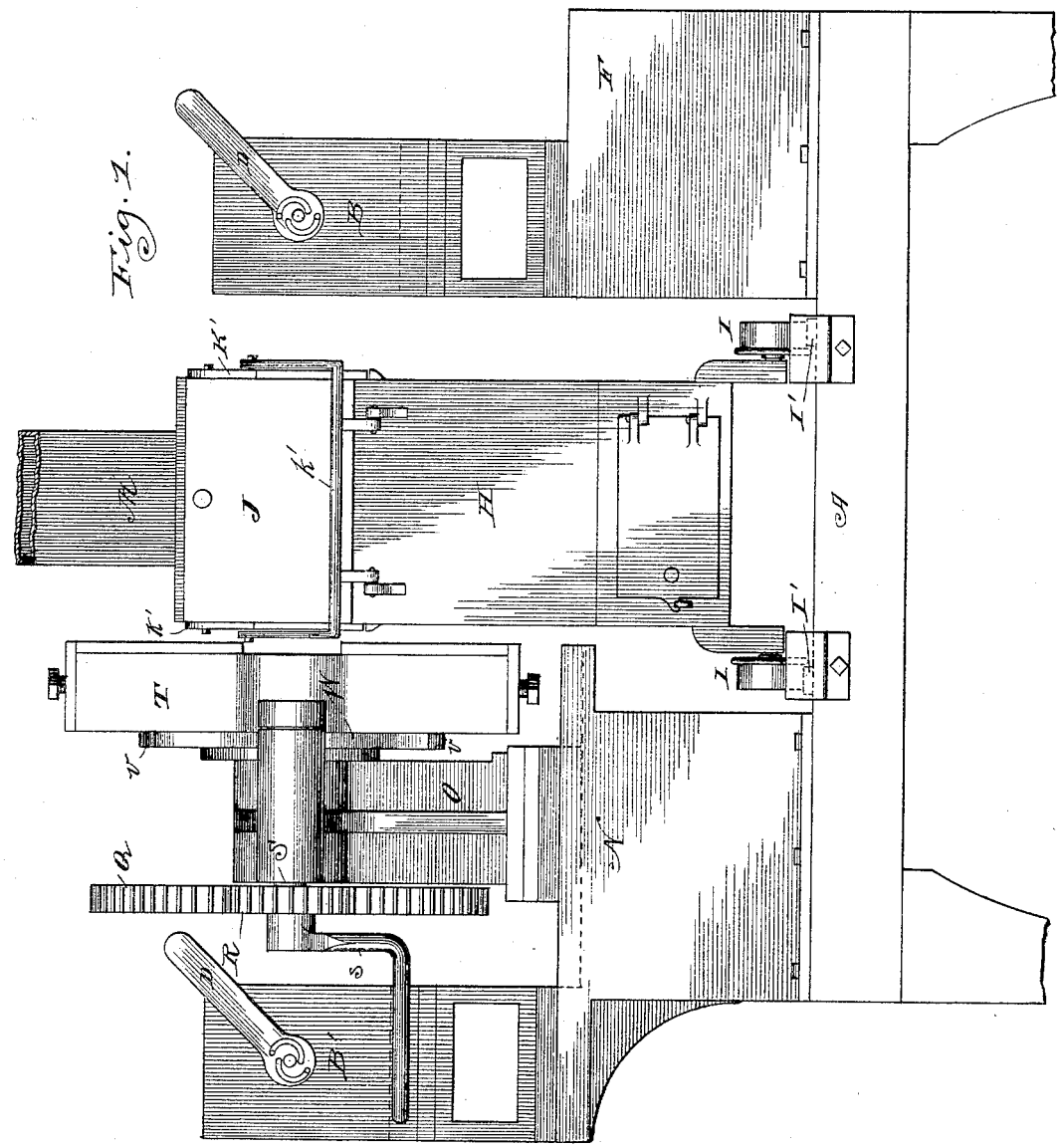
Figure 2:
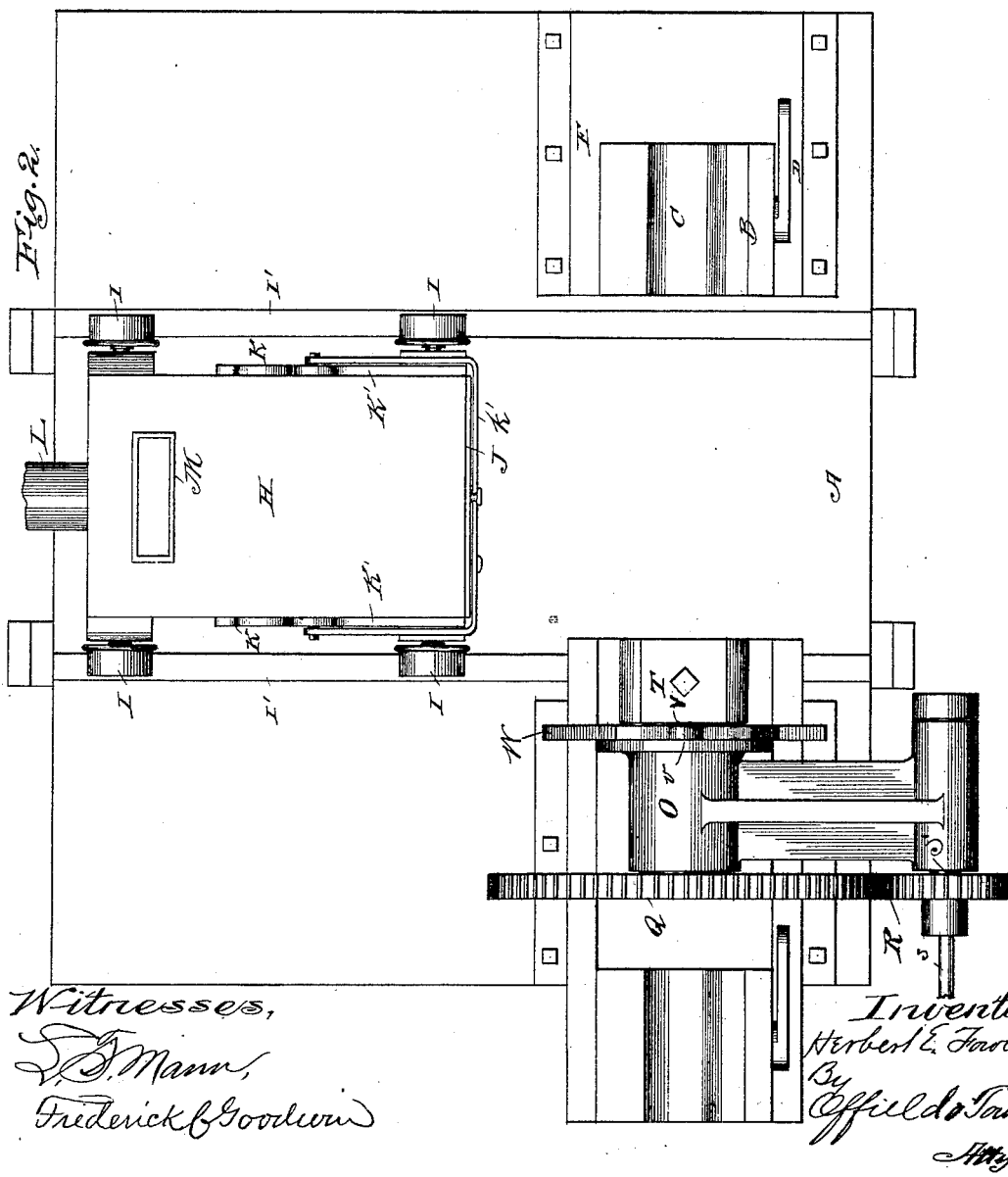

In the accompanying drawings, Figure 1 is a front elevation of the apparatus, showing a furnace movable in ways on a base, and a part of the furnace-stack being broken away and the furnace run back out of line. Fig. 2 is a plan view of the same parts; Fig. 3, an end elevation, and Fig. 4 the opposite end elevation. Figs. 5 and 6 are details of the rotating welding-head. Figs. 7, 8, and 9 show a liquid-fuel furnace, the burner of which is pivoted and may be swung to and from the work. Figs. 10, 11, 12, and 13 show a welding appliance comprising a frame having rolls journaled therein which are adapted to work the joint and perform the weld.

In the drawings, Figs. 1 to 4, A represents a suitable cast-iron base, on one corner of which is mounted the clamp B, which will have clamping-jaws C C, one of which is adjustable to and from the other by means of the handle D, and these jaws will be adapted to hold the class of work with which the apparatus is to be used. As shown in the drawings, they are adapted to the holding of pipe or rods.

B' represents a second clamp located on the opposite side of the furnace from clamp B, the opening between the jaws being in line with a furnace H, which is substantially rectangular in form and is mounted on the wheels I, traveling on rails I', extending transversely across the base. This furnace has a fire-pot, and a door J is hinged over the fuel-opening in its front wall.

K K' represent plates which are pivoted on opposite side walls of the furnace, and said plates have notches $k$, forming a guide and rest for the part to be welded. The side walls of the furnace are cut away above the fire-pot, and the plates K' are provided with a bale $k'$, whereby they may be thrown upward to uncover the opening in the side walls, which opening is indicated by the dotted lines of Fig. 3, and through which the part to be welded is brought to and removed from the fire.

L represents a blow-pipe, and M a smoke-pipe.

On the base A of the machine and on the opposite side of the track from the clamp B and in line therewith is mounted the welding or hammering appliances, which in the preferred form comprises a block N, mounted on the base A, and on which is adapted to slide bracket-frame O, having at its angle a bearing for a hollow shaft P. Said hollow shaft carries on its outer end a large gear-wheel Q, enmeshed with the driving-gear R, secured on the shaft S, journaled in the outer end of the bracket-arm. A crank $s$ is applied to the shaft and enables the hollow shaft to be driven by means of the gearing described, which latter may be varied, of course, in its construction and driven by power. On the inner end of the hollow shaft P is secured a hammer-head T, which is a hollow casting of rectangular form and contains therein reciprocating hammers U, which are backed by the springs $u$, the operative faces of the hammers being of such form as adapts them to act upon the joint to be welded. Studs V are connected with these hammers and project through slots in the side wall of the hammer-head, bearing anti-friction rollers $v$ on their outer ends. A cam-wheel W is secured upon the bearing for the hollow shaft in position to engage the rollers $v$, and when said shaft is rotated, carrying with it the hammer-head, the engagement of these rollers with the cam-disk effects the outward movement of the hammers, thus compressing the springs as the rollers rise on the cam-faces, and as they pass off the points of the cam-disk the springs return the hammers quickly, thus striking the blow.

With the construction illustrated in the drawings the hammers are caused to deliver six working-strokes at a single revolution of the hammer-head, and consequently the joint is worked with great rapidity. The frame bearing the hammering appliance is adapted to be adjusted to and from the joint in the line of the work.

In the use of my apparatus for welding pipe, for example, the sections of pipe to be welded may first be slightly telescoped together to hold them in line and passed through the hollow of the shaft of the hammering device and the ends of the parts held by the clamps. The door of the furnace being open, it is drawn forward on its track until the joint in the pipe is in or over the furnace-fire, when the door and hinged plates will be secured, as shown in the drawings, and the heat of the furnace-fire increased by the running of the blower. When the metal has been brought to a welding heat, the furnace is run back out of the way and the hammering appliance moved endwise until the joint is between the opposing faces of the hammers, which are then operated to effect the weld. One or both of the clamps may be made adjustable, in order to upset the ends of the parts after they are brought to welding heat, or the upsetting may be accomplished in other well-known ways.

In Figs. 7 to 13, inclusive, I have shown a modified construction of furnace and welding appliance. The clamps B B' are mounted on a bed or base plate A', supported upon a pedestal $A^2$, and the movable jaw of the clamp is operated by screw $b$, having a hand-wheel $b'$. The furnace is adapted to the burning of oil or gas, and comprises a burner-head $c$, supported on a swinging arm $d$, which is journaled in a frame formed by the branches $e'$ $e'$ of a pipe, through which fluid fuel is supplied, and which branches are supported by the braces $f$ from the bed-plate. The fluid is delivered by the branches $e'$ to small pipes $g$, which deliver at opposite sides of the pipe or bar to be welded. The burner-head is recessed for the admission of the pipe, and the opening may be closed by a hinged plate $d'$.

Figure 10:
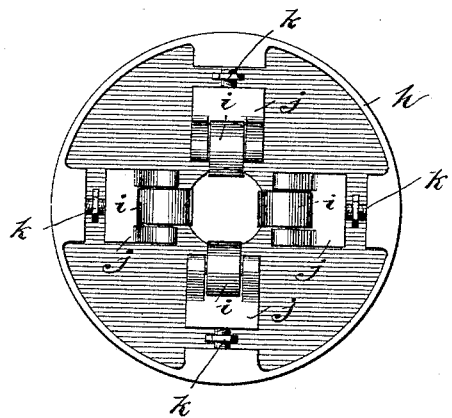
Figure 11:
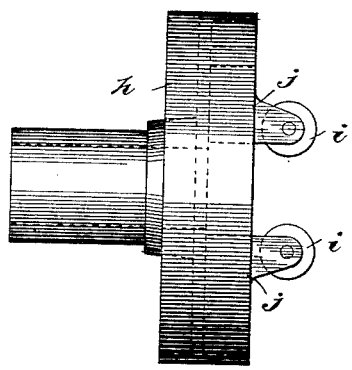

The welding appliance shown in Figs. 10 and 11 is designed to be used for working the joint on flat bars, and is moved laterally along the work. It comprises the recessed head $h$, having the rolls $i$, secured upon blocks $j$ and with their working-faces disposed at right angles to the face of the head. When the head is reciprocated, the rolls $i$ work the joint longitudinally.

Figure 12:
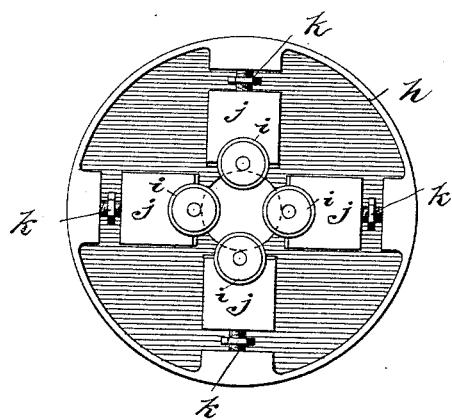
Figure 13:
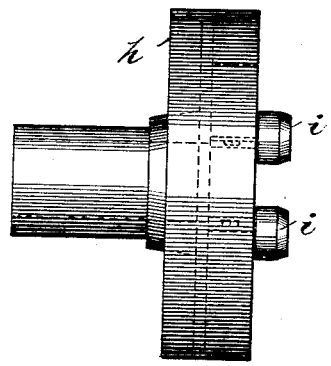

In Figs. 12 and 13 the rolls $i$ are set with their acting-faces in a plane parallel to the side of the head, and the latter is rotated about the work by the application of a belt or suitable gearing to its rim. The blocks $j$ are adjustable to and from the head-rim by means of the screws $k$ to adapt them to pipes or bars of different diameters.

I claim—

1. In an apparatus for welding metals, the combination, with clamps for holding stationary the parts to be welded, of a furnace movable to and from the line of work, and welding appliances arranged in line with the clamps and adapted to be moved along said line to and from the work, substantially as described.

2. An apparatus for welding metals, comprising, in combination, clamps for holding the work, a furnace movable to and from the line of work, and a rotating hammering or welding appliance arranged in line with the joint and adjustable along said line, substantially as described.

3. In an apparatus for welding metals, the combination, with a suitable base, of clamps mounted thereon for holding the work, a track on the base at right angles to the line of work, a furnace adapted to be moved along the track, and a rotating hammering or welding appliance secured on the base and movable in line with the joint, substantially as described.

4. In an apparatus for welding metals, the combination, with the clamps and furnace, of a rotating welding appliance in line with the clamps and comprising a rotatable hammer-head, having therein reciprocating hammers with studs projecting through the walls of the head and adapted to engage stationary cam-surfaces, a non-rotating cam, and springs against which the hammers are seated, whereby when the head is rotated the springs are compressed by the impingement of the studs upon the cam-surfaces and the springs operate to deliver the working blow when the studs are released from the cam-surfaces, substantially as described.

5. In a welding apparatus, the combination, with clamps for holding the work, of a furnace having a fuel-door in its front and apertures in its side walls leading from the front opening, pivoted plates on its side walls, adapted to support the work over the fire, said furnace being adjustable to and from the work, and welding appliances adjustably mounted in line with and adapted to be rotated about the joint during the welding thereof, substantially as described.

HERBERT E. FOWLER.

Witnesses:
 JOHN R. LEETE,
 S. V. BLYDENBURGH.